(12) United States Patent
Gupta et al.

(10) Patent No.: US 11,794,812 B2
(45) Date of Patent: Oct. 24, 2023

(54) VEHICLE FRAME FOR ELECTRIC VEHICLE

(71) Applicant: Ford Global Technologies, LLC, Dearborn, MI (US)

(72) Inventors: Ajay Kumar Gupta, Troy, MI (US); Leonard Anthony Shaner, New Baltimore, MI (US); Yu Liu, Canton, MI (US); John Wesley Stanley, Belleville, MI (US); Yu-Kan Hu, Ypsilanti, MI (US); Fungtai Charles Ko, Novi, MI (US); Petros Frantzeskakis, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 242 days.

(21) Appl. No.: 17/194,368

(22) Filed: Mar. 8, 2021

(65) Prior Publication Data
US 2022/0281526 A1    Sep. 8, 2022

(51) Int. Cl.
*B60K 1/04*    (2019.01)
*B62D 21/07*    (2006.01)
*B62D 29/00*    (2006.01)
*B62D 27/02*    (2006.01)

(52) U.S. Cl.
CPC ............... *B62D 21/07* (2013.01); *B60K 1/04* (2013.01); *B62D 27/02* (2013.01); *B62D 29/007* (2013.01)

(58) Field of Classification Search
CPC .. B60K 1/04; B60K 2001/0438; B62D 27/02; B62D 29/007
See application file for complete search history.

(56) References Cited

U.S. PATENT DOCUMENTS

| | | | |
|---|---|---|---|
| 2,964,331 A | 12/1960 | Sherman | |
| 6,273,486 B1 | 8/2001 | Ezzat et al. | |
| 10,392,052 B2* | 8/2019 | Takahashi | B62D 21/15 |
| 2002/0163173 A1 | 11/2002 | Ruehl et al. | |
| 2004/0239091 A1* | 12/2004 | Horton | B62D 23/005 280/781 |
| 2012/0313360 A1* | 12/2012 | Akaki | B62D 21/02 280/784 |
| 2018/0108891 A1* | 4/2018 | Fees | H01M 50/505 |

FOREIGN PATENT DOCUMENTS

CN    210416763 U    4/2020

* cited by examiner

*Primary Examiner* — Jason D Shanske
*Assistant Examiner* — James J Triggs
(74) *Attorney, Agent, or Firm* — Lorne Forsythe; Bejin Bieneman PLC

(57) ABSTRACT

An electric-vehicle frame includes a mid-section and an end section. The mid-section has first and second frame rails spaced from each other by a first distance along a cross-vehicle axis defining a battery compartment therebetween. The end-section has first and second frame rails spaced from each other by a second distance along the cross-vehicle axis smaller than the first distance. A first connector is fixed to the first frame rail of the mid-section and to the first frame rail of the end-section. A second connector is fixed to the second frame rail of the mid-section and to the second frame rail of the end-section.

18 Claims, 5 Drawing Sheets

VEHICLE FRAME FOR ELECTRIC VEHICLE

BACKGROUND

An electric vehicle includes a battery that powers the vehicle, including propulsion of the vehicle. For example, wheels of the vehicle are powered by one or more electric motors that are powered by the battery. The battery is relatively large and heavy and, accordingly, the battery is typically packaged below the passenger compartment of the vehicle. The battery is subject to being shorted during vehicle impact if loads are applied to the battery and/or if the cooling system used to cool the battery leaks coolant on the battery.

DETAILED DESCRIPTION

Figure 1:
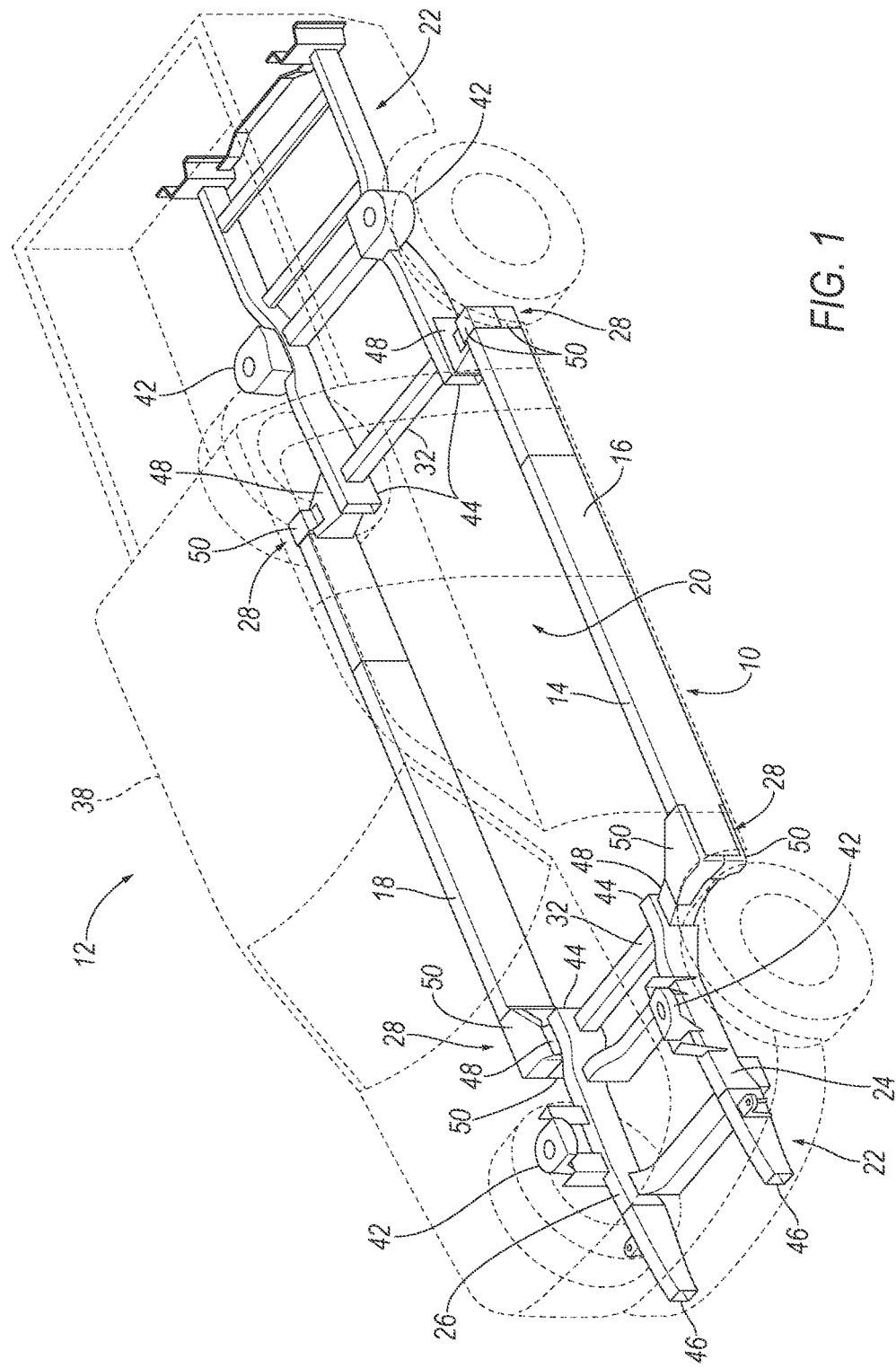
FIG. 1 is a perspective view of an electric vehicle with portions of the vehicle in hidden lines to show an electric-vehicle frame.

An electric-vehicle frame includes a mid-section having first and second frame rails spaced from each other by a first distance along a cross-vehicle axis defining a battery compartment therebetween. An end-section has first and second frame rails spaced from each other by a second distance along the cross-vehicle axis smaller than the first distance. A first connector is fixed to the first frame rail of the mid-section and to the first frame rail of the end-section. A second connector is fixed to the second frame rail of the mid-section and to the second frame rail of the end-section.

The electric-vehicle frame may include a cross-beam from the first frame rail of the end-section to the second frame rail of the end-section. The cross-beam may be aligned with the first connector and the second connector along a vehicle-longitudinal axis that is perpendicular to the cross-vehicle axis. The first frame rail of the end-section may be spaced from the first frame rail of the mid-section at the first connector, and the second frame rail of the end-section may be spaced from the second frame rail of the mid-section at the second connector.

The first frame rail of the end-section may be spaced from the first frame rail of the mid-section at the first connector, and the second frame rail of the end-section may be spaced from the second frame rail of the mid-section at the second connector.

The electric-vehicle frame may include an electric-vehicle battery disposed in the battery compartment.

The electric-vehicle frame may include a cab mount bracket fixed to the mid-section or the end-section and configured to support a vehicle body in a body-on-frame configuration.

The first and second frame rails of the mid-section may each have an end proximate the end-section, and the first and second frame rails of the end-section may each have an end between the end of the first frame rail of the mid-section and the first frame rail of the mid-section. The first connector may be fixed to the end of the first frame rail of the mid-section and the end of the first frame rail of the end-section, and the second connector may be fixed to the end of the second frame rail of the mid-section and the end of the second frame rail of the end-section. The electric-vehicle frame may include a cross-beam from the first frame rail of the end-section to the second frame rail of the end-section, the cross-beam being aligned with the first connector and the second connector along a vehicle-longitudinal axis that is perpendicular to the cross-vehicle axis. The first and second frame rails of the mid-section each may be straight from the end proximate the end-section to an end distal to the end-section along a vehicle-longitudinal axis that is perpendicular to the cross-vehicle axis.

The first and second frame rails of the mid-section each may be straight from an end proximate the end-section to an end distal to the end-section along a vehicle-longitudinal axis that is perpendicular to the cross-vehicle axis.

The first frame rail of the end-section may be elongated away from the first frame rail of the mid-section to an end distal to the mid-section and the first connector may be angled from the first frame rail of the mid-section in a direction inboard and toward the end of the first frame rail of the end-section. The second frame rail of the end-section may be elongated away from the second frame rail of the mid-section to an end distal to the mid-section and the second connector may be angled from the second frame rail of the mid-section in a direction inboard and toward the end of the second frame rail of the end-section.

The first connector may include multiple panels fixed to each other. At least two panels of the multiple panels may have different wall thickness.

The first and second frame rails of the mid-section may be roll-formed high-strength steel.

The first connector may be welded to the first frame rail of the mid-section and to the first frame rail of the end-section, and the second connector may be welded to the second frame rail of the mid-section and the second frame rail of the end-section.

The electric-vehicle frame may include a second end-section, the end-section and the second end-section extending in opposite directions from the mid-section. The second end-section may have first and second frame rails spaced from each other by a third distance along the cross-vehicle axis smaller than the first distance. A third connector is fixed to the first frame rail of the mid-section and to the first frame rail of the second end-section. A fourth connector may be fixed to the second frame rail of the mid-section and to the second frame rail of the second end-section.

With reference to the Figures, wherein like numerals indicate like parts throughout the several views, a vehicle frame 10 for an electric vehicle 12 (i.e., an electric-vehicle frame 10) includes a mid-section 14 having a first frame rail 16 and a second frame rail 18 spaced from each other by a first distance D1 along a cross-vehicle axis C. The first frame rail 16 and the second frame rail 18 of the mid-section 14 define a battery compartment 20 therebetween. The electric-vehicle frame 10 includes an end-section 22 having a first frame rail 24 and a second frame rail 26 spaced from each other by a second distance D2 along the cross-vehicle axis C smaller than the first distance D1. A first connector 28 is fixed to the first frame rail 16 of the mid-section 14 and to the first frame rail 24 of the end-section 22 and a second connector 28 is fixed to the second frame rail 18 of the mid-section 14 and to the second frame rail 26 of the end-section 22.

The connectors 28 transfer energy from the end-section 22 to the mid-section 14 in the event of a vehicle-impact at the end-section 22, e.g., a vehicle-frontal impact or a vehicle-rear impact. Specifically, the first connector 28 transmits force, i.e., creates a load path, from the first frame rail 24 of the end-section 22 to the first frame rail 16 of the mid-section 14. Similarly, the second connector 28 transmits force, i.e., creates a load path, from the second frame rail 18 of the end-section 22 to the second frame rail 26 of the mid-section 14. The load paths created by the first connector 28 and the second connector 28 direct force to the first frame rail 16 and the second frame rail 18, respectively, of the mid-section 14 to minimize or prevent force transmission to the battery compartment 20 between the first frame rail 16 and the second frame rail 18 to maintain integrity of an electric-vehicle battery 30 in the battery compartment 20. Specifically, the first connector 28 and the second connector 28 manage forces in the electric-vehicle frame 10 associated with electric vehicles due to the weight and location of the electric-vehicle battery 30 that affects the center-of-gravity of the electric vehicle 12.

The connectors 28 create load paths from the end-section 22 to the mid-section 14 that allow for the frame rails 16, 18, 24, 26 to be straight, as described further below. This increases the size of the battery compartment 20 to accommodate the size of the electric-vehicle battery 30 and/or for use in managing load transmission through the mid-section 14 to minimize or prevent load transmission to the electric-vehicle battery 30. As set forth below, a cross-beam 32 may also transmit loads between the first frame rail 24 and the second frame rail 26 of the end-section 22 to manage load transmission to minimize or prevent load transmission to the electric-vehicle battery 30.

The connectors 28 may be tunable, as described further below. This allows for different end-sections 22 and different mid-sections 14 to be interchangeably used for various vehicle models by tuning the connectors 28 to the end-section 22 and mid-section 14. For example, different vehicle models may have mid-sections 14 or end-sections 22 of different length and/or cross-vehicle width. As another example, different vehicle models may have bodies of different size and weight, batteries of different size or weight, and/or any other component of varying size and weight that adjusts the center-of-gravity of the vehicle and/or force transmission characteristics of the vehicle. These model differences can be accommodated for by tuning the connectors 28 to generate the desired load path from the end-section 22 to the mid-section 14.

The electric vehicle 12 may be any suitable type of automobile, e.g., a passenger or commercial automobile such as a sedan, a coupe, a truck, a sport utility vehicle, a crossover vehicle, a van, a minivan, a taxi, a bus, etc. The electric vehicle 12, for example, may be an autonomous vehicle. In other words, the electric vehicle 12 may be autonomously operated such that the electric vehicle 12 may be driven without constant attention from a driver, i.e., the electric vehicle 12 may be self-driving without human input.

The electric-vehicle battery 30 of the electric vehicle 12 powers propulsion of the electric vehicle 12, e.g., powers a drivetrain motor Examples of electric vehicles include a battery-electric vehicle (BEV), a hybrid-electric vehicle (HEV), a plug-in hybrid electric vehicles (PHEV), etc.

The electric-vehicle battery 30 may be of any suitable type for vehicular electrification, for example, lithium-ion batteries, nickel-metal hydride batteries, lead-acid batteries, ultracapacitors, etc. The electric-vehicle battery 30 may include at least one battery module. Each battery module may include one or more battery cells. A battery tray 34 may include a compartment that receives the battery modules. The electric-vehicle battery 30 may include any suitable hardware, e.g., wiring, connectors, circuits, etc., connecting the battery modules to each other and to electrified components of the electric vehicle 12.

The battery tray 34 supports the electric-vehicle battery 30 on the electric-vehicle frame 10. The battery tray 34 may be disposed in the battery compartment 20 defined by the first frame member 16 and the second frame member 18 of the mid-section 14. The electric-vehicle battery 30 may be disposed in and supported by the battery tray 34 and the battery tray 34 may be fixed to the electric-vehicle frame 10. The battery tray 34 may include support members 36 (shown for example in FIG. 2) elongated cross-vehicle. For example, each support member 36 may be fixed, e.g., bolted, to a bottom of the first frame rail 16 and the second frame rail 18 of the mid-section 14.

Figure 3:
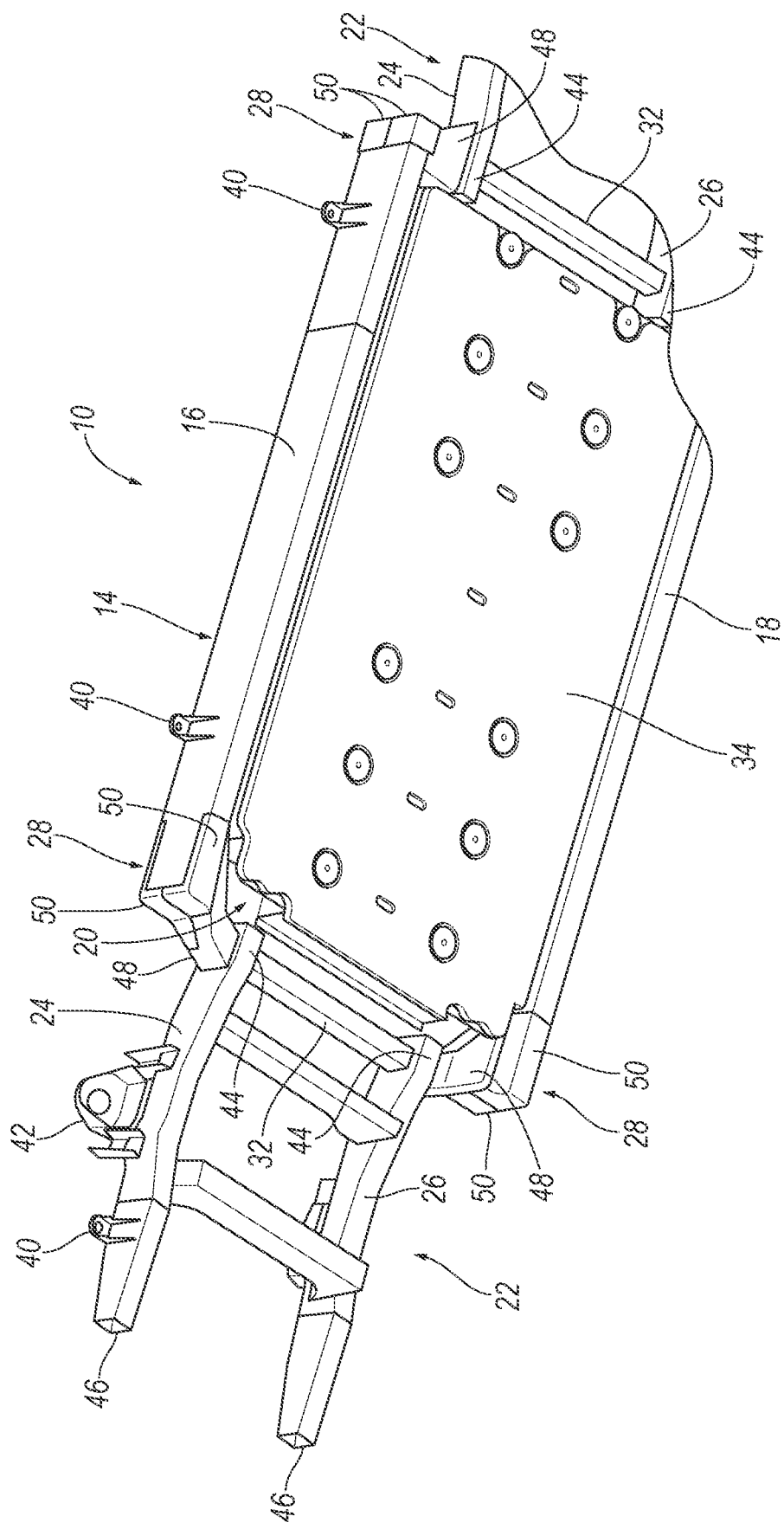
FIG. 3 is a perspective view of a bottom of the electric-vehicle frame.
Figure 4:
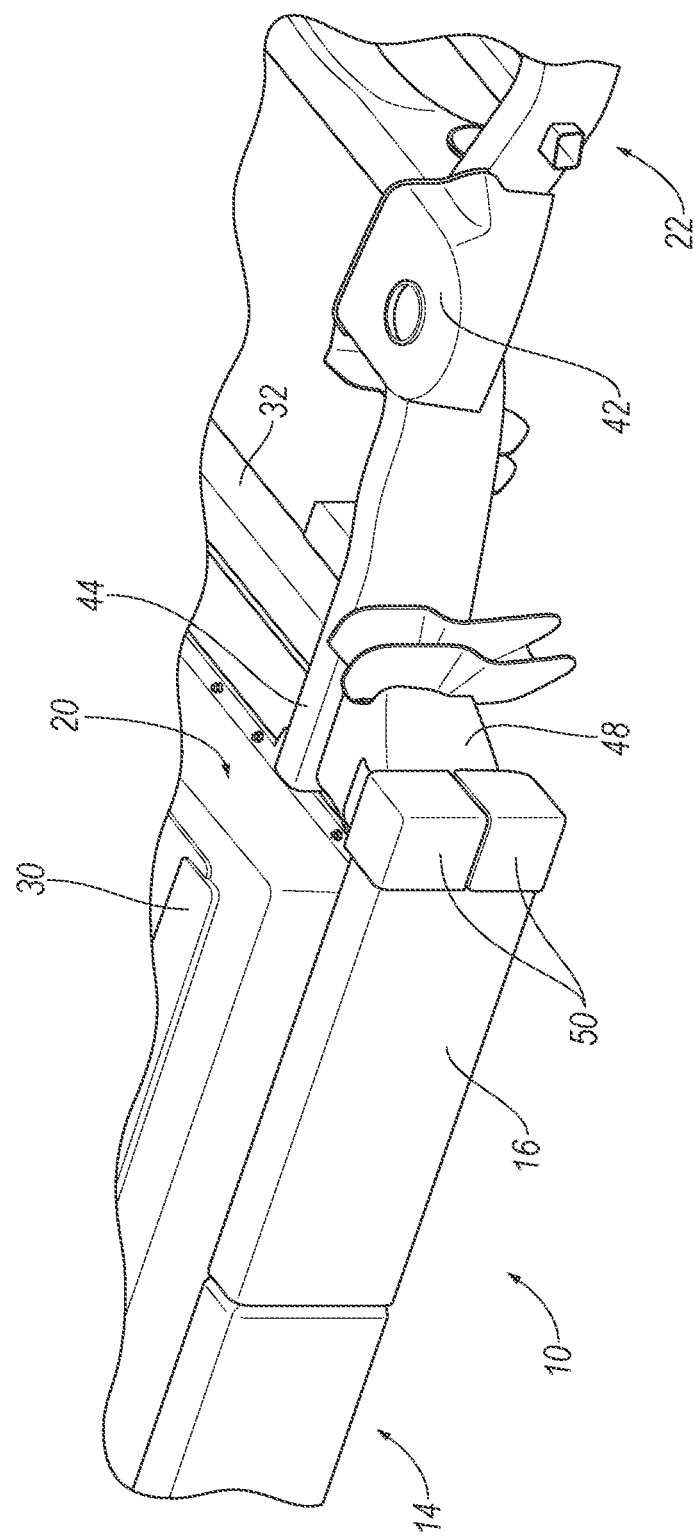
FIG. 4 is a magnified portion of the electric-vehicle frame including a connector.
Figure 5:
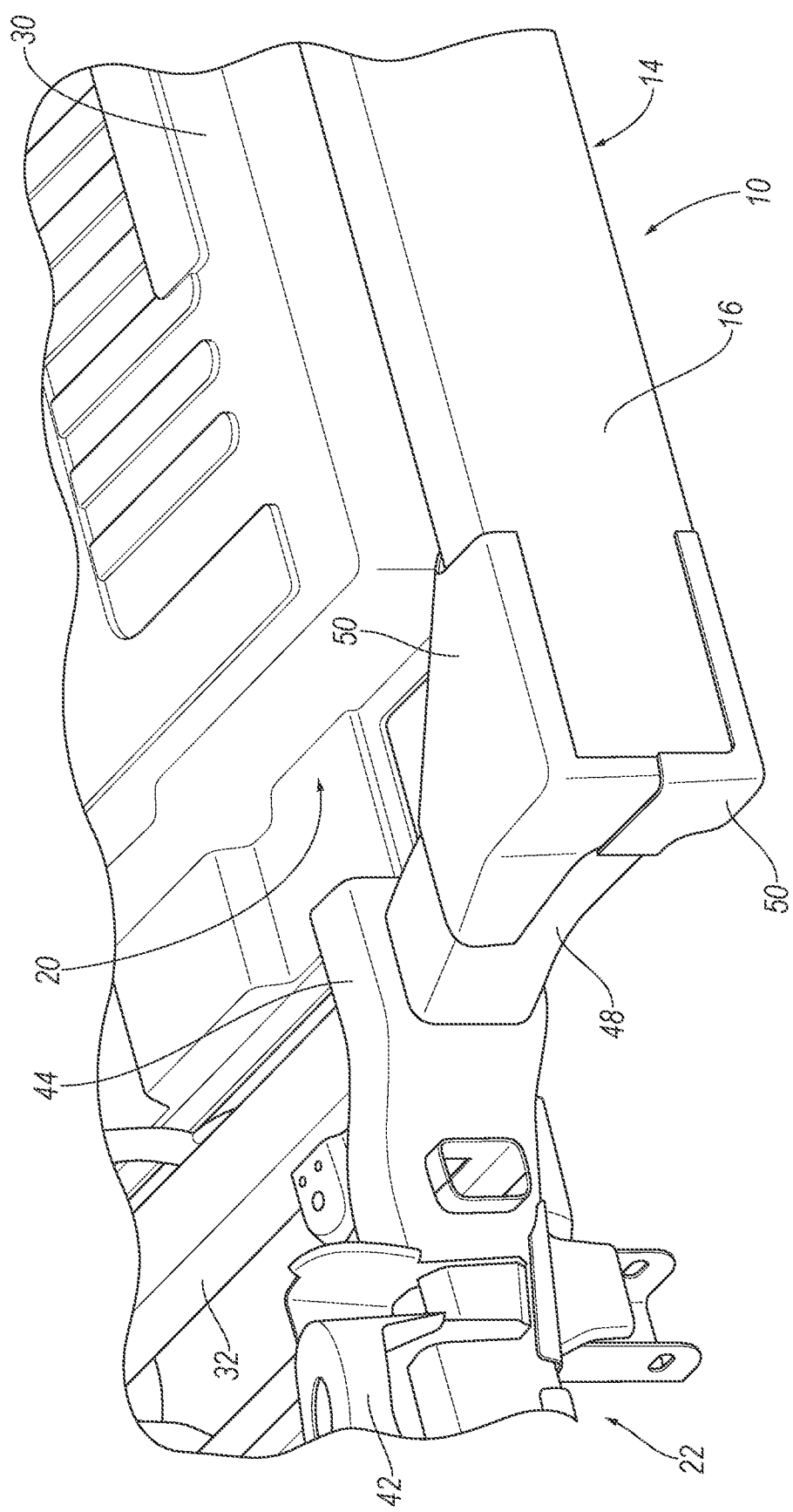
FIG. 5 is a magnified portion of the electric-vehicle frame including another of the connectors.

The battery tray 34 may include panels that, e.g., a bottom panel (shown in FIG. 3), a top panel (not shown in the figures), and side panels, that enclose the electric-vehicle battery 30. The panels may prevent intrusion of precipitation and dirt to the electric-vehicle battery 30. The top panel may separate the electric-vehicle battery 30 from components of the electric vehicle 12 above the battery tray 34, e.g., a passenger compartment.

The electric-vehicle frame 10 may be of a body-on-frame construction (also referred to as a cab-on-frame construction). In such an example, the electric vehicle 12 includes a vehicle body 38 mounted to the electric-vehicle frame 10. Specifically, the vehicle body 38 and the electric-vehicle frame 10 are separate components, i.e., are modular, and the vehicle body 38 is supported on and affixed to the electric-vehicle frame 10. The electric-vehicle frame 10 and vehicle body 38 may be of any suitable material, for example, steel, aluminum, and/or fiber-reinforced plastic, etc.

The electric-vehicle frame 10 may include a cab mount bracket 40 (shown for example in FIG. 2) fixed to the mid-section 14 or the end-section 22. In the example shown in the figures, a plurality of cab mount brackets 40 are fixed to the mid-section 14. The cab mount brackets 40 are configured to support the vehicle body 38 in a body-on-frame configuration. For example, the cab mount bracket 40 may include a post or a hole that receives a hole or a post, respectively, of the vehicle body 38 to connect the vehicle body 38 to the electric-vehicle frame 10. Specifically, the vehicle body 38 may be fixed to the cab mount bracket 40.

The electric-vehicle frame 10 may include suspension towers 42 that support suspension and/or steering components of the vehicle, e.g., to support a suspension shock. The suspension towers 42 may be fixed to the mid-section 14 or the end-section 22. In the example shown in the figures, the suspension towers 42 are fixed to the end-sections 22.

The vehicle body 38 includes body panels (not numbered) partially defining an exterior of the vehicle. The body panels may present a class-A surface, e.g., a finished surface exposed to view by a customer and free of unaesthetic blemishes and defects. The body panels include, e.g., a roof, doors, fenders, hood, decklid, etc. The vehicle body 38 may define a passenger cabin to house occupants, if any, of the vehicle.

The electric-vehicle frame 10 includes the mid-section 14 and at least one end-section 22. The mid-section 14 defines the battery compartment 20. The battery compartment 20 is a space occupied by the electric-vehicle battery 30 when the electric-vehicle battery 30 is installed on the vehicle. The end-section 22 may support steering and suspension components, drivetrain components, and other vehicle components. In the example shown in the figures, the electric-vehicle frame 10 includes two end-section 22s spaced from each other along a longitudinal axis of the vehicle, i.e., on opposite sides of the mid-section 14. Specifically, the electric-vehicle frame 10 shown in the figures includes a front end-section 22 and a rear end-section 22. In such an example, the end-sections 22 may of different design and may support different components but also include common features, e.g., a first frame rail 24, a second frame rail 26, etc. Common features among the end-section 22 shown in the figures are identified with common numerals. Both end-sections 22 are connected to the mid-section 14 by respective connectors 28, i.e., first, second, third, and fourth connectors 28. Numerical adjectives, e.g., "first," "second," "third," and "fourth," are used herein merely as identifiers and are not intended to indicate order or importance.

The electric-vehicle frame 10 is elongated along the vehicle-longitudinal axis L. The first frame rail 16 and the second frame rail 18 of the mid-section 14 are spaced from each along a cross-vehicle axis C and the first frame rail 24 and the second frame rail 26 of the end-section 22 are spaced from each other along the cross-vehicle axis C. "Spaced along the cross-vehicle axis C" means spaced from each other on the cross-vehicle axis C and/or spaced from each other on a line parallel to the cross-vehicle axis C. The cross-vehicle axis C is perpendicular to the vehicle-longitudinal axis L. A vehicle-longitudinal direction is a direction parallel to the vehicle-longitudinal axis L. A cross-vehicle directions is parallel to the cross-vehicle axis C.

The first frame rail 24 and the second frame 26 of the end-section 22 may each be elongated away from the mid-section 14 from an end 44 proximate the mid-section 14 to an end 46 distal the mid-section 14. The first frame rail 24 and/or the second frame rail 26 of the end-section 22 may be straight from end 44 to end 46. Similarly, the first frame rail 16 and/or the second frame rail 18 of the mid-section 14 may be straight from end to end. The frame rails 16, 18, 24, 26 are straight in that the frame rail 16, 18, 24, 26 has a straight axis. The frame rails 16, 18, 24, 26 may be straight along the vehicle-longitudinal axis L, i.e., on an axis parallel to the vehicle-longitudinal axis L. One or more of the frame rails 16, 18, 24, 26 may have a constant cross-section from end to end. For example, the frame rails 16, 18 shown in the figures are straight from end to end with constant cross-section from end to end. the frame rails 24, 26 of the end-sections 22 are shown in the figures as being straight along the vehicle-longitudinal axis L and having bends in a vertical plane and varying cross-sections.

As set forth above, the first frame rail 16 and second frame rail 18 of the mid-section 14 are spaced from each other by the first distance D1 along the cross-vehicle axis C and the first frame rail 24 and second frame rail 26 of the end-section 22 are spaced from each other by the second distance D2 along the cross-vehicle axis C. The second distance D2 is smaller than the first distance D1. Specifically, the first frame rail 16 and the second frame rail 18 of the mid-section 14 are spaced from each other by the first distance D1 at the ends adjacent the end-section 22 and the first frame rail 24 and second frame rail 26 of the end-section 22 are spaced from each other by the second distance D2 at the ends 44 adjacent the mid-section 14. In the example shown in the figures, the first frame rail 14 and the second frame rail 16 of the mid-section 14 are straight along the vehicle-longitudinal axis L such the first frame rail 14 and the second frame rail 16 are spaced from each other by the first distance D1 from end to end and the first frame rail 24 and the second frame rail 26 of the end-section 22 are straight along the vehicle-longitudinal axis L such that the first frame rail 24 and the second frame rail 26 are spaced from each other by the second distance D2 end 44 to end 46. In examples including two end-sections 22, the first frame rail 24 and second frame rail 26 of one end-section 22 may be spaced from each other the same distance or a different distance than the space between the first frame rail 24 and second frame rail 26 of the other end-section 22.

The frame rails 16, 18, 24, 26 may be roll-formed. For example, the frame rails 16, 18, 24, 26 may be roll-formed high-strength steel. Specifically, in examples in which the frame rails 16, 18, 24, 26 are straight, the frame rails may be roll-formed. The roll-forming process, which may use high-strength steel, is enabled by the frame rails 16, 18, 24, 26 being straight. As other examples, the frame rails 16, 18, 24, 26 may be of any suitable material, e.g., suitable types of steel, aluminum, and/or fiber-reinforced plastic, etc. The frame rails 16, 18, 24, 26 of the mid-section 14 and the end-section 22 may be hollow. The frame rails 16, 18, 24, 26 of the mid-section 14 and the end-section 22 may be rectangular in cross-section, e.g., a hollow rectangle.

The connectors 28 connect the frame rails 24, 26 of the end-section 22 to the frame rails 16, 18 of the mid-section 14. Specifically, a first connector 28 is fixed to the first frame rail 16 of the mid-section 14 and to the first frame rail 24 of the end-section 22 and a second connector 28 fixed to the second frame rail 18 of the mid-section 14 and to the second frame rail 26 of the end-section 22. Specifically, as shown in example in the figures, the connectors 28 are fixed to an inboard side of the frame rail 16, 18 of the mid-section 14 and an outboard side of the frame rail 24, 26 of the end-section 22. The connectors 28 are fixed directly to the frame rail 16, 18 of the mid-section 14 and the frame rail 24, 26 of the end-section 22. The connectors 28 are stationary relative to the frame rails 16, 18, 24, 26 absent a vehicle impact that deforms the frame rails 16, 18, 24, 26 and/or the connectors 28. The connectors 28, as an example, may be welded to the respective frame rails 16, 18, 24, 26 of the mid-section 14 and end-section 22. Alternatively, the connectors 28 may be fixed to the respective frame rails 16, 18, 24, 26 in any suitable fashion.

The connectors 28 fill a cross-vehicle space between the frame rail 16, 18 of the end-section 22 and the frame rail 24, 26 of the mid-section 14. The first frame rail 24 of the end-section 22 is spaced from the first frame rail 16 of the mid-section 14 at the first connector 28. Likewise, the second frame rail 26 of the end-section 22 is spaced from the second frame rail 18 of the mid-section 14 at the second connector 28. Specifically, the first frame rail 24 of the end-section 22 is spaced from the first frame rail 16 of the mid-section 14 defining a space therebetween and the connector 28 fills that space. Likewise, the second frame rail 26 of the end-section 22 is spaced from the second frame rail 18 of the mid-section 14 defining a space therebetween and the connector 28 fills that space.

The connector 28 between the first frame rail 16 of the mid-section 14 and the first frame rail 24 of the end-section 22 is angled from the first frame rail 16 of the mid-section 14 in a direction inboard and toward the distal end of the first frame rail 24 of the end-section 22. Similarly, the connector 28 between the second frame rail 18 of the mid-section 14 and the second frame rail 26 of the end-section 22 is angled from the second frame rail 18 of the mid-section 14 in a direction inboard and toward the distal end of the second frame rail 26 of the end-section 22. "Inboard" is used herein to refer to a direction toward the vehicle-longitudinal axis L.

The angle of the connector 28 from the mid-section 14 inboard and toward the distal end of the respective frame rail 24, 26 of the end-section 22 directs axial force from the frame rail 24, 26 of the end-section 22 to the frame rail 16, 18 of the mid-section 14 in the event of a vehicle impact that creates axial force along the frame rail 24, 26 of the end-section 22, e.g., a vehicle-frontal impact or a rear impact. This directs the force around the battery compartment 20 and minimizes or prevents forces from the end-section 22 from reaching the electric-vehicle battery 30. This force management also allows for the frame rails 24, 26 of the end-section 22 and the mid-section 14 to be straight, as described above.

Since the frame rails 16, 18, 24, 26 are straight and the connectors 28 angle from the mid-section 14 in a direction inboard and toward the distal ends 46 of the end-section 22, the battery compartment 30 may be generally rectangular. This increases the useful size of the battery compartment 20 to accommodate the size and shape of the electric-vehicle battery 30.

As set forth above, the connectors 28 may be tunable, allowing for interchangeability of end-sections 22, mid-sections 14, and connectors 28 for different vehicle models. Factors in such tuning may include, for example, the magnitude of the angle of the connectors 28 between at the end-section 22 and the mid-section 14, length of the connector 28, geometry of the connector 28, wall thickness of the connector 28, number of panels of the connector 28 (as described below), etc. In examples including two end-sections 22, the connectors 28 between one end-section 22 and the connectors 28 between the other end-section 22 may be designed to manage loads the same or differently, i.e., may be tuned the same or differently, depending on the expected energy management to be performed by the connector 28. This difference may be accomplished by altering the factors for tuning described above. Similarly, the connector 28 between the first frame rail 24 of the end-section 22 and the first frame rail 16 of the mid-section 14 may be tuned the same or differently than the connector 28 between the second frame rail 24 of the end-section 22 and the second frame rail 18 of the mid-section 14 depending on the expected energy management to be performed by the connectors 28.

The connectors 28 may include multiple panels 48, 50 fixed to each other. For example, in the examples shown in the figures, each of the connectors 28 includes a main panel 48 extending from the frame rail 24, 26 of the end-section 22 to the frame rail 16, 18 of the mid-section 14 and two reinforcement panels 50 fixed to the main panel 48. The main panel 50 may have a hollow rectangle cross-section. As an example, the reinforcement panels 50 are shown in the figures as fixed to the frame rail 16, 18 of the mid-section 14. As another example, the reinforcement panels 50 may be fixed to the frame rail 24, 26 of the end-section 22 or to both the frame rail 16, 18 of the mid-section 14 and the frame rail 24, 26 of the end-section 22. The main panel 48 and the reinforcement panels 50 may be fixed to each other and the frame rails 16, 18, 24, 26 by welding, for example.

As set forth above, the connectors 28 may be tuned to adjust the energy absorbing characteristics of the connectors 28. For example, the size and the shape of the panels 48, 50 may be adjusted. As another example, the wall thickness of the panels 48, 50 may be adjusted. As an example, some of the panels 48, 50 may have a different wall thickness than the others. As another example, the material type of the connectors 28 may be adjusted. As an example, all of the panels 48, 50 of the connector 28 may be of the same material type, e.g., the same type of steel. As another example, some of the panels 48, 50 may be of a different material type than the others, e.g., a different type of steel, different type of metal, or material other than metal.

The electric-vehicle frame 10 may include one or more cross-beams. Specifically, one or both of the end-sections 22 may include a cross-beam 32 from the first frame rail 24 of the end-section 22 to the second frame rail 26 of the end-section 22. In the example shown in the figures, both end-sections 22 include the cross-beam 32, respectively, in addition to other cross-beams. The other cross-beams may be, for example, structural reinforcements between the first frame rail 24 and the second frame rail 26, motor/engine mounts, steering and/or suspension components, and/or support structure for other vehicle components.

Figure 2:
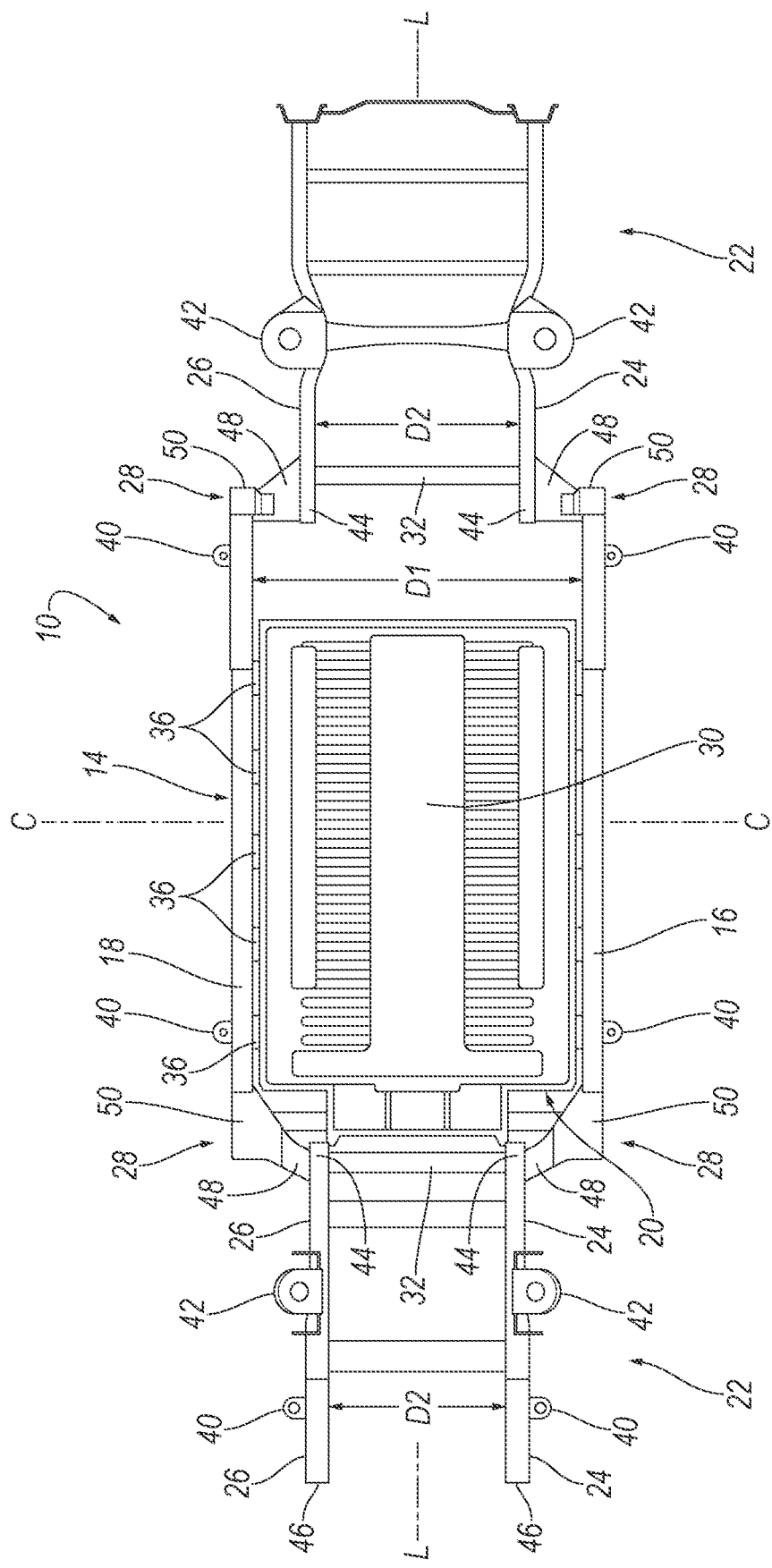
FIG. 2 is a top view of the electric-vehicle frame.

The cross-beam 32 provides a load-path from the first frame rail 24 to the second frame rail 26 when the first frame rail 24 is subject to impact force and the cross-beam 32 provides a load path from the second frame rail 26 to the first frame rail 24 when the second frame rail 26 is subject to impact force. An example load path in the first frame rail 24 is shown in FIG. 2 in which the first frame rail 24 receives a longitudinal load, e.g., a front-end vehicle impact or a rear-end vehicle impact. Accordingly, during a vehicle impact that generates axial force in at least one of the frame rails 24, 26 of the end-section 22, the cross-beam 32 distributes some of the force from one of the frame rails 24, 26 of the end-section 22 to the other frame rail 24, 26 of the end-section 22. This distribution reduces load concentration by transferring some of the load to the other side of the electric-vehicle frame 10.

The cross-beam 32 may be aligned with the first connector 28 and the second connector 28 in the cross-vehicle direction. In other words, the cross-beam 32 is aligned with the first connector 28 and the second connector 28 along the vehicle-longitudinal axis L. Specifically, a line in a cross-vehicle direction perpendicular to the longitudinal axis extends through the cross-beam 32, the first connector 28, and the second connector 28.

In operation, during an impact that generates axial force in at least one of the frame rails 24, 26 of the end-section 22, e.g., a vehicle frontal impact or a vehicle rear impact, the axial force is directed along the frame rail 24, 26 of the end-section 22 to the connector 28. Some of the force is distributed by the cross-beam 32 to the other side of the end-section 22 and some of the force is transferred by the connector 28 to the frame rail 16, 18 of the mid-section 14. With this distribution of force, the force is directed around the battery compartment 20 to minimize or prevent forces from reaching the electric-vehicle battery 30 in the battery compartment 20.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An electric-vehicle frame comprising:
a mid-section having first and second frame rails spaced from each other by a first distance along a cross-vehicle axis defining a battery compartment therebetween;
an end-section having first and second frame rails spaced from each other by a second distance along the cross-vehicle axis smaller than the first distance;

a first connector fixed to the first frame rail of the mid-section and to the first frame rail of the end-section; and a second connector fixed to the second frame rail of the mid-section and to the second frame rail of the end section; the first connector including multiple panels fixed to each other.

2. The electric-vehicle frame as set forth in claim 1, further comprising a cross-beam from the first frame rail of the end-section to the second frame rail of the end-section.

3. The electric-vehicle frame as set forth in claim 2, wherein the cross-beam is aligned with the first connector and the second connector along a vehicle-longitudinal axis that is perpendicular to the cross-vehicle axis.

4. The electric-vehicle frame as set forth in claim 3, wherein the first frame rail of the end-section is spaced from the first frame rail of the mid-section at the first connector, and the second frame rail of the end-section is spaced from the second frame rail of the mid-section at the second connector.

5. The electric-vehicle frame as set forth in claim 1, wherein the first frame rail of the end-section is spaced from the first frame rail of the mid-section at the first connector, and the second frame rail of the end-section is spaced from the second frame rail of the mid-section at the second connector.

6. The electric-vehicle frame as set forth in claim 1, further comprising an electric-vehicle battery disposed in the battery compartment.

7. The electric-vehicle frame as set forth in claim 1, further comprising a cab mount bracket fixed to the mid-section or the end-section and configured to support a vehicle body in a body-on-frame configuration.

8. The electric-vehicle frame as set forth in claim 1, wherein the first and second frame rails of the mid-section are each straight from the end proximate the end-section to an end distal to the end-section along a vehicle-longitudinal axis that is perpendicular to the cross-vehicle axis.

9. The electric-vehicle frame as set forth in claim 1, wherein:

the first frame rail of the end-section is elongated away from the first frame rail of the mid-section to an end distal to the mid-section and the first connector is angled from the first frame rail of the mid-section in a direction inboard and toward the end of the first frame rail of the end-section; and the second frame rail of the end-section is elongated away from the second frame rail of the mid-section to an end distal to the mid-section and the second connector is angled from the second frame rail of the mid-section in a direction inboard and toward the end of the second frame rail of the end-section.

10. The electric-vehicle frame as set forth in claim 1, wherein at least two panels of the multiple panels have different wall thickness.

11. The electric-vehicle frame as set forth in claim 1, wherein the first and second frame rails of the mid-section are roll-formed high-strength steel.

12. The electric-vehicle frame as set forth in claim 1, wherein the first connector is welded to the first frame rail of the mid-section and to the first frame rail of the end-section, and the second connector is welded to the second frame rail of the mid-section and the second frame rail of the end-section.

13. The electric-vehicle frame as set forth in claim 1, further comprising:

a second end-section, the end-section and the second end-section extending in opposite directions from the mid-section;

the second end-section having first and second frame rails spaced from each other by a third distance along the cross-vehicle axis smaller than the first distance;

a third connector fixed to the first frame rail of the mid-section and to the first frame rail of the second end-section; and a fourth connector fixed to the second frame rail of the mid-section and to the second frame rail of the second end-section.

14. The electric-vehicle frame as set forth in claim 3, wherein:

the first frame rail of the end-section is spaced from the first frame rail of the mid-section along the cross-vehicle axis with the first connector extending from the first frame rail of the end-section to the first frame rail of the mid-section along the cross-vehicle axis; and the second frame rail of the end-section is spaced from the second frame rail of the mid-section along the cross-vehicle axis with the second connector extending from the second frame rail of the end-section to the second frame rail of the mid-section along the cross-vehicle axis.

15. The electric-vehicle frame as set forth in claim 14, wherein the first connector is directly connected to the first frame rail of the end-section and the first frame rail of the mid-section, and the second connector is directly connected to the second frame rail of the end-section and the second frame rail of the mid-section.

16. The electric-vehicle frame as set forth in claim 14, wherein the first and second frame rails of the mid-section each have an end proximate the end-section, and the first and second frame rails of the end-section each have an end between the end of the first frame rail of the mid-section and the second frame rail of the mid-section.

17. The electric-vehicle frame as set forth in claim 16, wherein the first connector is fixed to the end of the first frame rail of the mid-section and the end of the first frame rail of the end-section, and the second connector is fixed to the end of the second frame rail of the mid-section and the end of the second frame rail of the end-section.

18. The electric-vehicle frame as set forth in claim 17, wherein the first and second frame rails of the mid-section are each straight from an end proximate the end-section to an end distal to the end-section along a vehicle-longitudinal axis that is perpendicular to the cross-vehicle axis.

* * * * *